E. S. KEOGH.
ELECTRIC LAMP MOUNT.
APPLICATION FILED DEC. 11, 1913.
1,112,624.
Patented Oct. 6, 1914.
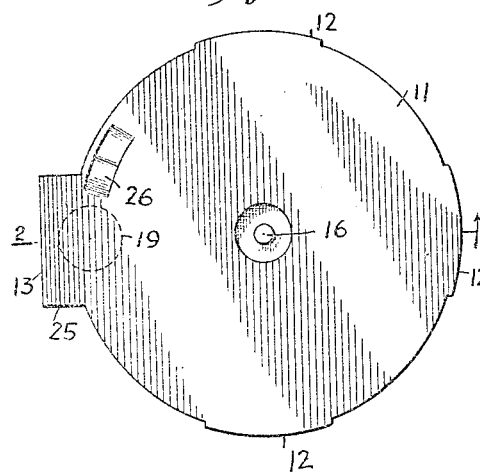
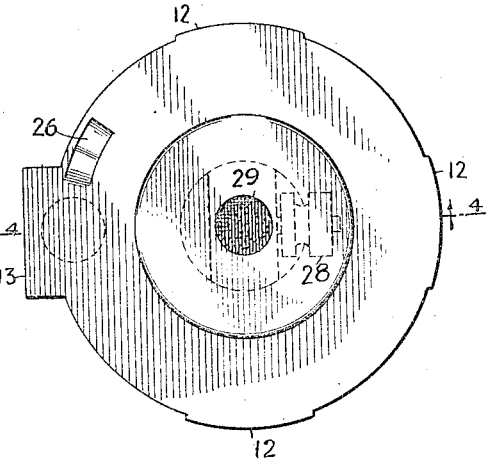
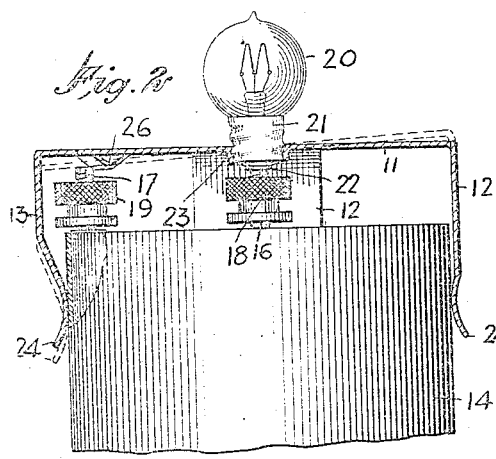
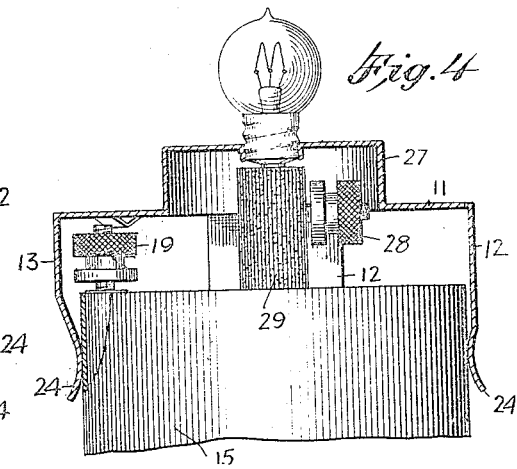
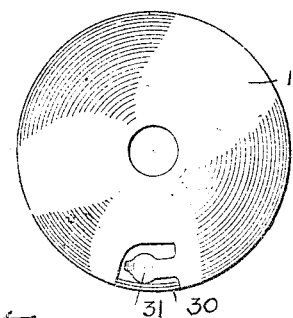
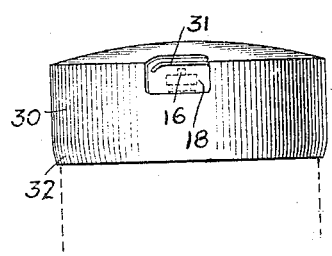
INVENTOR
Edward S. Keogh
WITNESSES
BY
ATTORNEYS

UNITED STATES PATENT OFFICE.

EDWARD S. KEOGH, OF FREEPORT, NEW YORK.

ELECTRIC-LAMP MOUNT.

1,112,624.

Specification of Letters Patent.

Patented Oct. 6, 1914.

Application filed December 11, 1913. Serial No. 805,854.

*To all whom it may concern:*

Be it known that I, EDWARD S. KEOGH, a citizen of the United States, and a resident of Freeport, in the county of Nassau and State of New York, have invented a new and Improved Electric-Lamp Mount, of which the following is a full, clear, and exact description.

Among the principal objects which the present invention has in view are: to provide a mount for low-voltage electric lamps, to hold the same in operative position upon an electric battery element; to provide a simple, cheap and efficient means for employing an electric lamp in connection with a single electric-battery element; and to provide means in conjunction with the above-mentioned devices for at will temporarily or continuously maintaining a closed circuit incorporating a lamp of the character mentioned.

In the drawings: Figure 1 is a top plan view of a mount constructed and arranged in accordance with the present invention, showing in conjunction therewith a battery element; Fig. 2 is a vertical section taken as on the line 2—2 in Fig. 1, of a mount, a battery element and an electric lamp being shown in conjunction therewith; Fig. 3 is a top plan view, showing a modified form of the mount herein set forth; Fig. 4 is a vertical section taken as on the line 4—4 in Fig. 3, showing in conjunction therewith a fragment of a battery element and a lamp; Fig. 5 is a top plan view of a mount constructed and arranged in accordance with a further modification of the invention; Fig. 6 is a side view of the same.

As seen in the drawings, the preferred form of the invention provides a body plate 11, which is provided with a series of spring clips 12, 12 and 13. The plates 11 and their clips 12 and 13 are designed primarily for adjustment upon an electric battery cell or element, such as 14 or 15. The elements 14 and 15 are two recognized conventional forms of battery cells of the type generally known as "dry" and "semi-dry" cells. These cells are usually provided with screw extensions 16 and 17, which form, in conjunction with the nuts 18 and 19, binding-posts in the usual service. The screw extension 16 is usually disposed in the center of the element 14 or 15, being, as a rule, electrically connected with, and forming the terminal of the carbon element of the cell.

The extension 17 is usually electrically connected with the electrically-opposite or zinc element of the cell, and as this in the usual type of cell above-mentioned forms the exterior casing thereof, the extension 17 is usually to be found at or adjacent the side edge of said cell.

The conventional low-voltage lamp, such as indicated in the drawings by the numeral 20, has a metallic covering 21, which is separated from a center block 22 by any suitable insulating material. At the center thereof, the plate 11 is perforated, the edges of the perforation being pressed downwardly to form an open-bottomed socket, the side 23 whereof has a thread pressed or otherwise formed therein, said thread corresponding with the thread of the covering 21.

The clips 12 and 13 are each provided with out-turned lips 24, shaped to receive the upper edge of the cells 14 and 15 therebetween, and to press outwardly said clips, the spring tension whereof thereafter holds the mount in position upon said cell. The conventional cell being externally provided with an electric insulating surface, no current is transferred from the cell thereby, until the plate 11 is brought into contact with the extension 17. The cell 14 or 15 being thus equipped, the lamp 20 is screwed into the perforation having the side 23, the thread of said side 23 and the thread of the cover 21 of the stem of the lamp corresponding. When the plug 22 rests upon the extensions 16 connected with the carbon of the cell, the circuit is completed through the filament of the lamp 20. By continuing to screw the lamp within the socket perforation, the plate 11 is lifted out of contact with the extension 17, and the flow of current is thereby suspended. By this means, it will be appreciated, the separation between the body of the plate 11 and the end of the extension 17 may be nicely adjusted. Having thus arranged the lamp 20, cell 14 and mount for said lamp, the lamp is illuminated by depressing the plate 11 to contact with the extension 17, the projection or tab 25 of the plate 11 indicating to the user the location of the extension 17, said tab being provided to avoid the nut 19, as best seen in Fig. 2 of the drawings. The construction is such that when pressure is relieved from the tab 25, the natural spring of the material lifts the same out of contact with the extension 17. Failing to do this, a slight pressure on the opposite side of the plate 11, causing the same to rock on the extension 16, would have the desired effect.

When it is desired to illuminate the lamp 20 continuously, this is best accomplished by revolving the mount on the cell 14, until the projection 26 passes over and rests upon the extension 17. The clips 12 and 13 are so constructed as to yield sufficiently to permit the projection 26 to pass above and rest upon the extension 17, in such a manner as to retain sufficient pressure thereon to produce an electric contact between said projection 26 and the extension 17, and this without lifting the plug 22 from contact with the extension 16.

In Figs. 3 and 4 of the drawings, the plate 11 is shown as provided with a central cylinder or turret 27. The center of the plate is thus raised to accommodate the variation in the construction of the cell 15 over that shown, as compared with the construction of the cell 14. In the cell 15, it will be observed, a binding screw 28 is extended from the side of the carbon 29 of the cell. In other respects, the plate 11 is identical in construction and operation with the form shown in Figs. 1 and 2 of the drawings.

In Figs. 5 and 6 of the drawings, the modification consists in substituting for the clips 12 and 13, a cylindrical side 30, adapted to totally inclose the upper end of the cell. When using this form of the invention, the top and side are cut away to form a depressed resilient tongue 31 arranged to over-ride and rest upon the binding screw or extension 17 of the cell. In this form of the device, the lower edge 32 is contracted upon the cell 14 or 15, as the case may be, to grip the body thereof, and to form a steadying element when the device is rotated on the body of the cell.

Claim.

An electric lamp mount, comprising a metallic socket plate having a screw-threaded opening to hold an electric lamp, said plate having integrally formed therewith, clips to extend over and grip the sides of an electric cell when forced therebetween; and a contact projection formed on the under side of said plate to engage one of the terminals of said electric cell.

In testimony whereof I have signed my name to this specification in the presence of two subscribing witnesses.

EDWARD S. KEOGH.

Witnesses:
E. F. MURDOCK,
PHILIP D. ROLLHAUS.